(12) United States Patent
Xu

(10) Patent No.: US 8,246,192 B2
(45) Date of Patent: Aug. 21, 2012

(54) TOUCH PEN AND PORTABLE ELECTRONIC DEVICE USING THE SAME

(75) Inventor: Huang-Yu Xu, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 595 days.

(21) Appl. No.: 12/486,082

(22) Filed: Jun. 17, 2009

(65) Prior Publication Data

US 2010/0149794 A1  Jun. 17, 2010

(30) Foreign Application Priority Data

Dec. 16, 2008  (CN) .......................... 2008 1 0306290

(51) Int. Cl.
*F21L 13/00* (2006.01)

(52) U.S. Cl. ....................................... 362/183; 362/118

(58) Field of Classification Search .................. 362/183, 362/118

See application file for complete search history.

(56) References Cited

U.S. PATENT DOCUMENTS

| 7,663,509 B2* | 2/2010 | Shen ................................. 341/20 |
| 2008/0077200 A1* | 3/2008 | Bendett et al. ................... 607/89 |
| 2008/0231614 A1* | 9/2008 | Huang et al. .................. 345/179 |
| 2009/0134311 A1* | 5/2009 | Yeh .................................. 250/205 |
| 2009/0196021 A1* | 8/2009 | Liu ................................. 362/118 |

FOREIGN PATENT DOCUMENTS

| CN | 1553407 A | 12/2004 |
| KR | 10-2008-0011520 A | 2/2008 |

* cited by examiner

*Primary Examiner* — Evan Dzierzynski
(74) *Attorney, Agent, or Firm* — Altis Law Group, Inc.

(57) ABSTRACT

A portable electronic device includes a housing; a touch tip portion fixed to one end of the housing; a cover fixed to the other end of the housing; a laser unit disposed in the housing adjacent to the touch tip portion; a rechargeable battery disposed in the housing electrically connected to the laser unit; and a first charging connecting portion and a second charging connecting portion positioned on an outer surface of the housing apart. The first charging connecting portion includes a first connecting end electrically connected to a negative electrode of an external power and a second connecting end electrically connected to the positive electrode of the rechargeable battery. The second charging connecting portion includes a first connecting end electrically connected to a positive electrode of an external power and a second connecting end electrically connected to the negative electrode of the rechargeable battery.

20 Claims, 3 Drawing Sheets

TOUCH PEN AND PORTABLE ELECTRONIC DEVICE USING THE SAME

BACKGROUND

1. Technical Field

The present disclosure relates to touch pens, and particularly, to a touch pen having a pointer capability.

2. Description of the Related Art

With the development of wireless communication and information processing technologies, portable electronic devices, such as mobile phones and personal digital assistants (PDAs), are now in widespread use. In one such portable electronic device, a touch pen can be used to press at a specific location on a transparent touch control panel to generate a control signal corresponding to the specific location.

Referring to FIG. 3, a typical touch pen 100 having a pointer capability includes a housing 10, a touch tip portion 13, a laser unit 15, a cover 16, and a battery 17. The housing 10 is substantially columnar-shaped. The touch tip portion 13 is fixed to one distal end of the housing 10. The cover 16 is fixed to the other distal end of the housing 10. The laser unit 15 and the battery 17 are received in the housing 10. The laser unit 15 is received into the cover 16. The battery 17 provides electrical power to the laser unit 15. The cover 16 defines a through hole 161 for laser beams from the laser unit 15 passing through. However, it may not be convenient to replace the battery 17 fixed in the housing 10.

Therefore, there is room for improvement within the art.

BRIEF DESCRIPTION OF THE DRAWINGS

Many aspects of the present touch pen can be better understood with reference to the following drawings. The components in the drawings are not necessarily drawn to scale, the emphasis instead being placed upon clearly illustrating the principles of the present touch pen. Moreover, in the drawings, like reference numerals designate corresponding parts throughout the several views.

DETAILED DESCRIPTION

Figure 1:
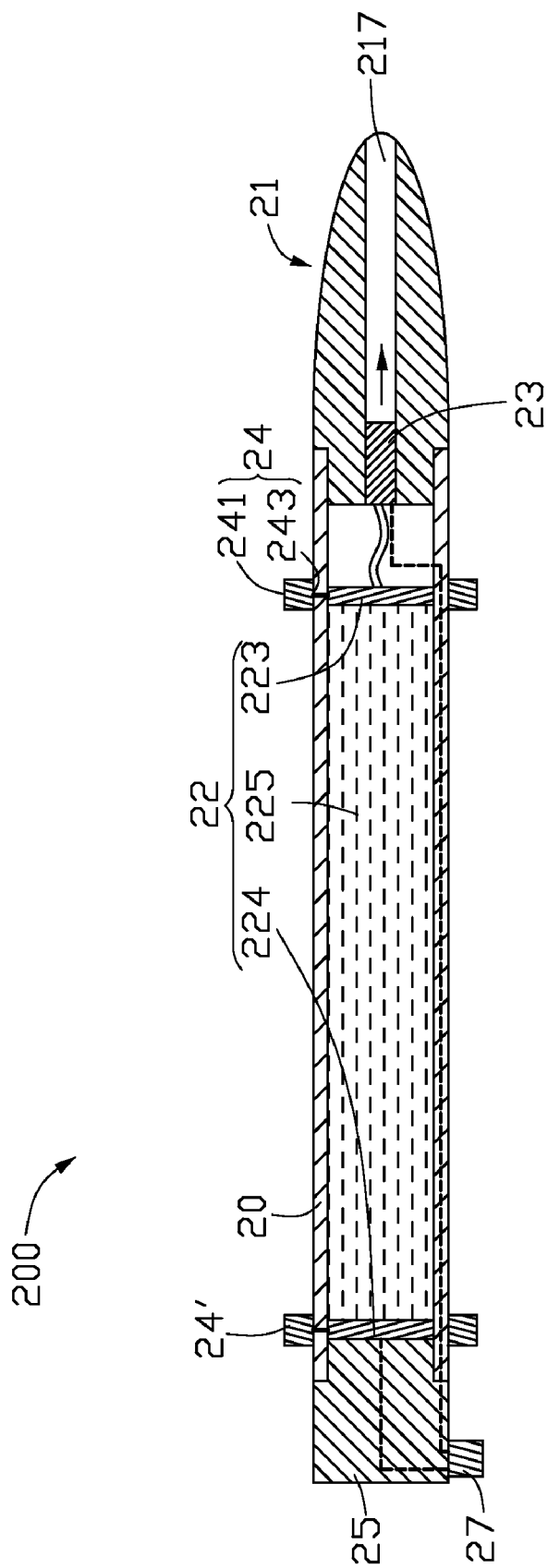
FIG. 1 is a side, cross-sectional view of an embodiment of a touch pen.

Referring to FIG. 1, an embodiment of a touch pen 200 includes a housing 20, a touch tip portion 21, a rechargeable battery 22, a laser unit 23, a pair of charging connecting portions 24, a cover 25, and a switch 27. The housing 20 is substantially columnar. The touch tip portion 21 is fixed to one distal end of the housing 20. The cover 25 is fixed to the other distal end of the housing 20. The touch tip portion 21 defines a through hole 217. The laser unit 23 is mounted in the through hole 217, such that laser beams from the laser unit 23 can be projected out passing through the through hole 217. The rechargeable battery 22 is positioned between the cover 25 and the touch tip portion 21 in the housing 20.

In this embodiment, the rechargeable battery 22 is a rechargeable lithium battery. The rechargeable battery 22 includes a first mounting plate 223, a second mounting plate 224, and an electrolyte 225. The first mounting plate 223 and the second mounting plate 224 are separately mounted with the housing 20. The first mounting plate 223, the second mounting plate 224 and the housing 20 cooperatively define a chamber to receive the electrolyte 225. The first mounting plate 223 defines a positive electrode (not shown) made of active materials selected from the group consisting of a material capable of intercalating/deintercalating lithium ions, a lithium metal, a lithium-containing alloy, and a material capable of forming a lithium-containing compound by reversibly reacting lithium. The second mounting plate 224 defines a negative electrode (not shown) made of active carbon. The electrolyte 225 includes a non-aqueous organic solvent, a lithium salt, and an additive.

The pair of charging connecting portions 24, 24' are positioned on an outer surface of the housing 20, and correspond to the first and second mounting plates 223, 224 respectively. Each of the charging connecting portions 24, 24' includes a first connecting end 241 and a second connecting end 243 opposite to the first connecting end 241. The first connecting end 241 of the charging connecting portions 24 is configured to electrically connect with a negative electrode of an external power. The second connecting end 243 of the charging connecting portion 24 electrically connects with the positive electrode of the rechargeable battery 22. The first connecting end 241 of the charging connecting portion 24' electrically connects with a positive electrode of an external power. The second connecting end 243 of the charging connecting portion 24' electrically connects with the positive electrode of the rechargeable battery 22.

In the illustrated embodiment, each of the charging connecting portions 24, 24' is a metallic ring. The first connecting end 241 of the charging connecting portions 24, 24' is located at an upper surface of the metallic ring, and the second connecting end 243 of the charging connecting portions 24, 24' is located at an inner surface of the metallic ring opposite to the upper surface.

The laser unit 23 is electrically connected to the positive electrode and the negative electrode of the rechargeable battery 22 via leads, such that the rechargeable battery 22 can provide electrical power to the laser unit 23. In the illustrated embodiment, one lead passes through the cover 25, and the switch 27 is fixed to the cover 25 to control whether an electrical circuit connecting the laser unit 22 and the rechargeable battery 22 is on or off. In alternative embodiments, the switch 27 can be fixed to any position to control whether an electrical circuit connecting the laser unit 22 and the rechargeable battery 22 is on or off.

Figure 2:
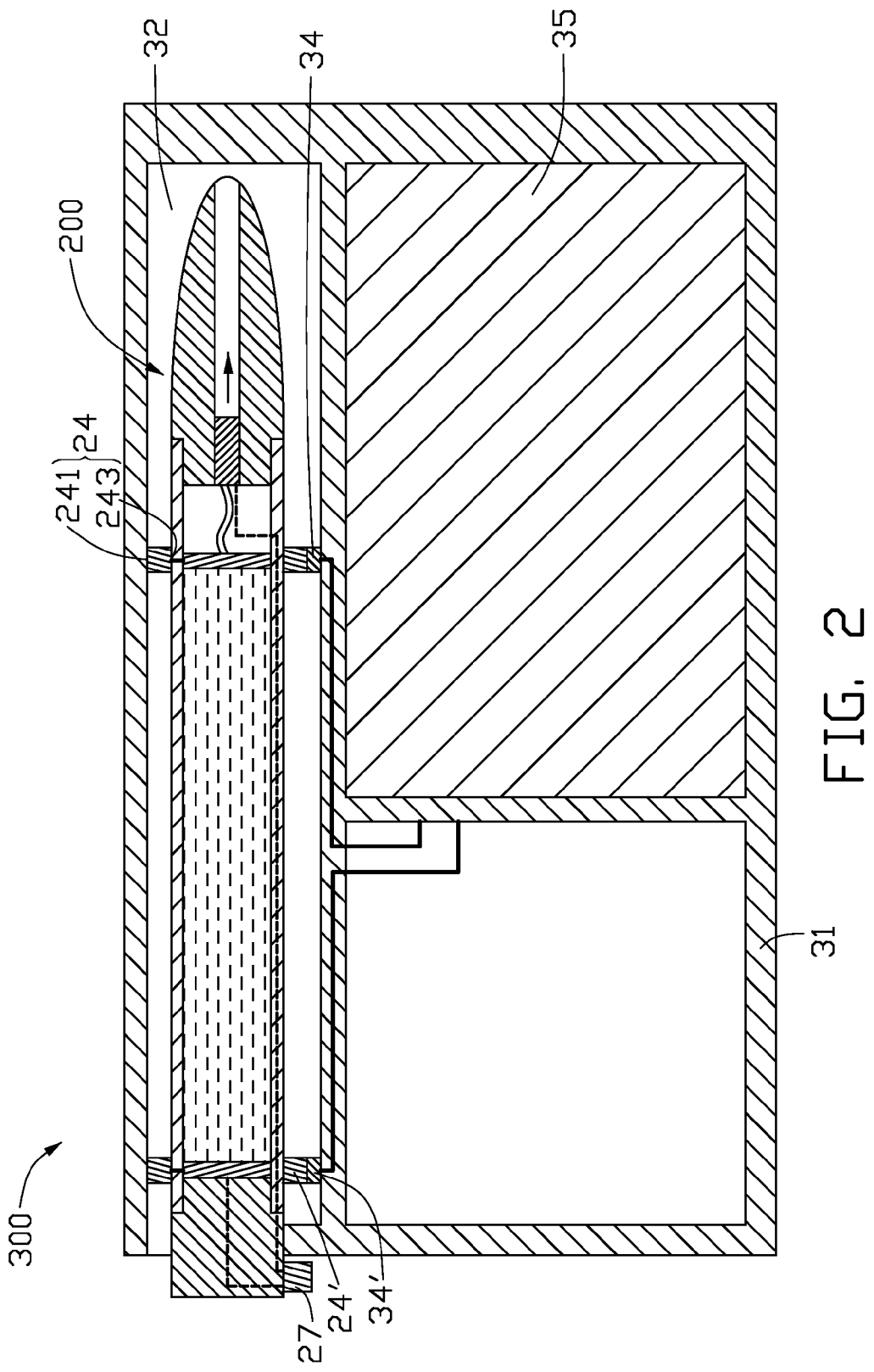
FIG. 2 is a side, cross-sectional view of the touch pen of FIG. 1 assembled in a portable electronic device.
Figure 3:
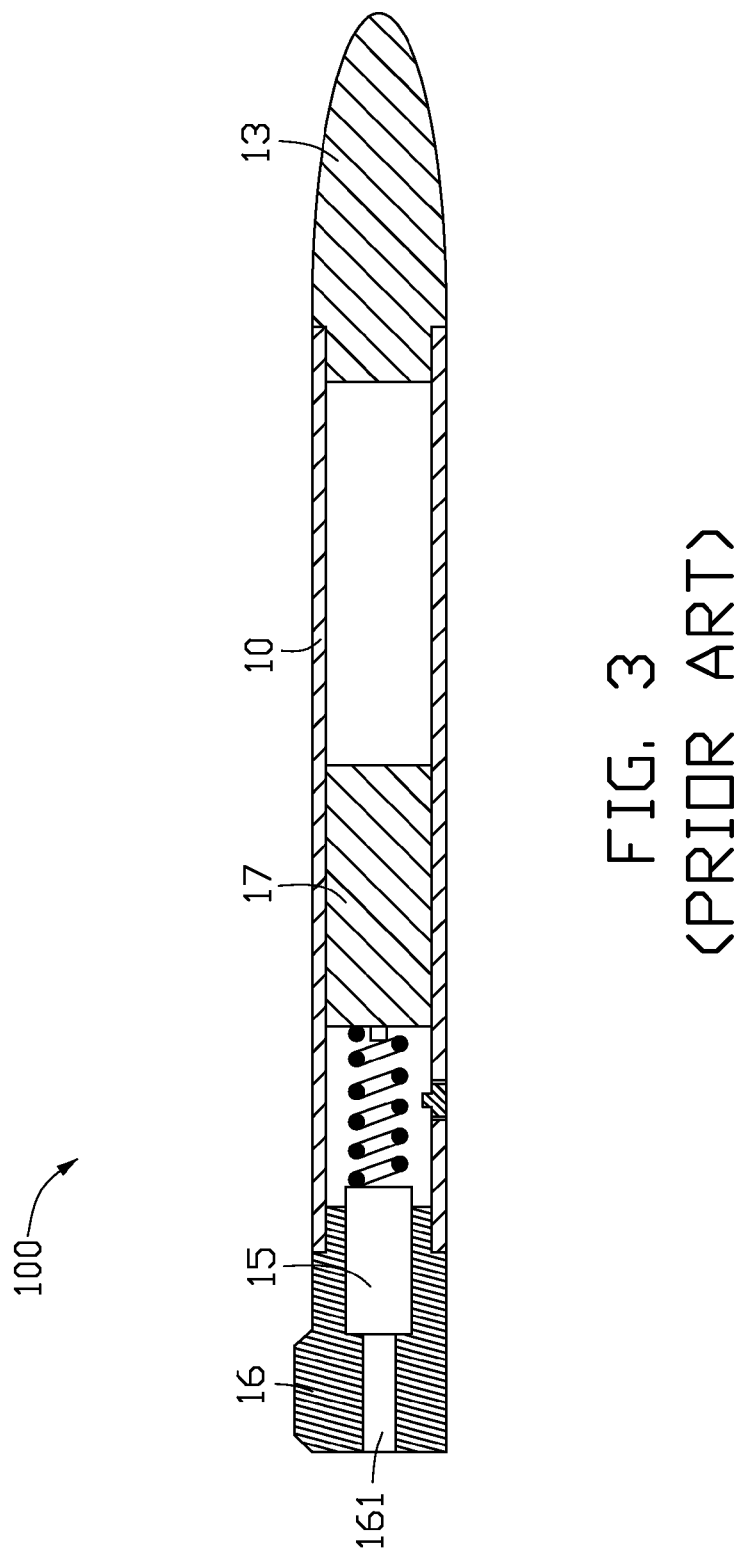
FIG. 3 is a side, cross-sectional view of a conventional touch pen.

Referring to FIG. 2, the touch pen 200 is assembled in a portable electronic device 300. The portable electronic device 300 includes a main body 31, a touch pen holder 32, a pair of charging connecting portions 34, 34' and a battery 35. The touch pen holder 32 and the battery 35 are positioned in the main body 31. The battery 35 is near the touch pen holder 32. The charging connecting portions 34, 34' are formed on an inner surface of the touch pen holder 32 and correspond to the pair of the charging connecting portions 24, 24'. In this embodiment, the charging connecting portion 34 is electrically connected to a negative electrode of the battery 35 and the charging connecting portion 34' is electrically connected to a positive electrode of the battery 35. The charging connecting portions 34, 34' are selected from metallic protrusions and metallic elastic sheet.

When the touch pen 200 is inserted into the touch pen holder 32 of the portable electronic device 300, the charging connecting portions 24, 24' are electrically connected to the charging connecting portions 34, 34' respectively, such that the touch pen 200 is charged by the battery 35 until an electrical power of the rechargeable battery 22 is full.

It is to be understood that, the first mounting plate 223 may define a negative electrode and the second mounting plate 224 may define a positive electrode. Accordingly, the charging connecting portion 34' is electrically connected to the negative electrode of the battery 35, and the charging connecting portion 34 is electrically connected to the positive electrode of the battery 35.

It should be pointed out that the charging connecting portions 24, 24' may be elongated metallic sheets. One end of the elongated metallic sheet is the first connecting end 241, and the other end of the elongated metallic sheet is the second connecting end 243. It should be pointed out that the through hole 217 can be omitted, if the touch tip portion 21 is made of transparent materials.

It should be pointed out that the laser unit 23 may be positioned between the rechargeable battery 22 and the touch tip portion 21 to project laser beams that can be directed to the through hole 217.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A touch pen, comprising:
a housing having two distal ends;
a touch tip portion fixed to one distal end of the housing;
a cover fixed to the other distal end of the housing;
a laser unit disposed in the housing adjacent to the touch tip portion;
a rechargeable battery disposed in the housing electrically connected to the laser unit to provide electrical power to the laser unit; and
a first charging connecting portion and a second charging connecting portion positioned on an outer surface of the housing apart, wherein the first charging connecting portion comprises a first connecting end electrically connected to a positive electrode of an external power and a second connecting end electrically connected to the negative electrode of the rechargeable battery; the second charging connecting portion comprises a first connecting end electrically connected to a negative electrode of an external power and a second connecting end electrically connected to the positive electrode of the rechargeable battery.

2. The touch pen of claim 1, wherein each of the first and second charging connecting portions is a metallic ring, the first connecting end is located at an upper surface of the metallic ring and the second connecting end is located at an inner surface of the metallic ring opposite to the upper surface.

3. The touch pen of claim 1, wherein each of the first and second charging connecting portions is an elongated metallic sheet, one end of the elongated metallic sheet is the first connecting end, and the other end of the elongated metallic sheet is the second connecting end.

4. The touch pen of claim 1, wherein the touch tip portion is made of transparent materials, and laser beams are projected out by the laser unit and passes through the touch tip portion.

5. The touch pen of claim 1, wherein the touch tip portion defines a through hole therein, the laser unit is inserted into an end of the touch tip portion towards the through hole such that laser beams from the laser unit are projected out passing through the through hole.

6. The touch pen of claim 1, wherein the rechargeable battery comprises a first mounting plate, a second mounting plate mounted with the housing, and an electrolyte; the first mounting plate, the second mounting plate and the housing cooperatively define a chamber to receive the electrolyte.

7. The touch pen of claim 6, wherein one of the first and second mounting plates defines a positive electrode, and the other of the first and second mounting plates defines a negative electrode made of active carbon.

8. The touch pen of claim 1, further comprising a switch fixed to the cover to control whether an electrical circuit connecting the laser unit and the rechargeable battery is on or off.

9. A portable electronic device, comprising:
a main body;
a touch pen holder defined in the main body, the touch pen holder comprising a pair of charging connecting portions at an inner surface thereof;
a battery received in the main body electrically connected to the pair of the charging connecting portions of the touch pen holder; and
a touch pen received in the touch pen holder, the touch pen comprising a housing having two distal ends, a touch tip portion fixed to one distal end of the housing, a cover fixed to the other distal end of the housing, a laser unit disposed in the housing adjacent to the touch tip portion, a rechargeable battery disposed in the housing electrically connected to the laser unit to provide electrical power to the laser unit, and a first charging connecting portion and a second charging connecting portion positioned on an outer surface of the housing apart, wherein the first charging connecting portion comprises a first connecting end electrically connected to a negative electrode of the battery via one of the charging connecting portions of the touch pen holder and a second connecting end electrically connected to the positive electrode of the rechargeable battery; the second charging connecting portion comprises a first connecting end electrically connected to a positive electrode of the battery via the other of the charging connecting portions of the touch pen holder and a second connecting end electrically connected to the negative electrode of the rechargeable battery.

10. The portable electronic device of claim 9, wherein each of the first and second charging connecting portions is a metallic ring, the first connecting end is located at an upper surface of the metallic ring and the second connecting end is located at an inner surface of the metallic ring opposite to the upper surface.

11. The portable electronic device of claim 9, wherein each of the first and second charging connecting portions is an elongated metallic sheet, one end of the elongated metallic sheet is the first connecting end, and the other end of the elongated metallic sheet is the second connecting end.

12. The portable electronic device of claim 9, wherein the touch tip portion is made of transparent materials, and laser beams are projected out by the laser unit and passes through the touch tip portion.

13. The portable electronic device of claim 9, wherein the touch tip portion defines a through hole therein, the laser unit is inserted into an end of the touch tip portion towards the through hole such that laser beams from the laser unit are projected out passing through the through hole.

14. The portable electronic device of claim 9, wherein the rechargeable battery comprises a first mounting plate, a second mounting plate mounted with the housing, and an electrolyte; the first mounting plate, the second mounting plate and the housing cooperatively define a chamber to receive the electrolyte.

15. The portable electronic device of claim 14, wherein one of the first and second mounting plates defines a positive electrode, and the other of the first and second mounting plates defines a negative electrode made of active carbon.

16. The portable electronic device of claim 9, further comprising a switch fixed to the cover to control whether an electrical circuit connecting the laser unit and the rechargeable battery is on or off.

17. A touch pen, comprising:
a housing;
a touch tip portion fixed to the housing;
a laser unit disposed in the housing adjacent to the touch tip portion;
a rechargeable battery disposed in the housing electrically connected to the laser unit to provide electrical power to the laser unit; and
a first charging connecting portion and a second charging connecting portion positioned on an outer surface of the housing apart, wherein the first charging connecting portion comprises a first connecting end electrically connected to a positive electrode of an external power and a second connecting end electrically connected to the negative electrode of the rechargeable battery; the second charging connecting portion comprises a first connecting end electrically connected to a negative electrode of an external power and a second connecting end electrically connected to the positive electrode of the rechargeable battery; each of the first and second charging connecting portions is a metallic ring, the first connecting end is located at an upper surface of the metallic ring and the second connecting end is located at an inner surface of the metallic ring opposite to the upper surface.

18. The touch pen of claim 17, wherein each of the first and second charging connecting portions is an elongated metallic sheet, one end of the elongated metallic sheet is the first connecting end, and the other end of the elongated metallic sheet is the second connecting end.

19. The touch pen of claim 18, wherein the touch tip portion is made of transparent materials, and laser beams are projected out by the laser unit and passes through the touch tip portion.

20. The touch pen of claim 19, wherein the rechargeable battery comprises a first mounting plate, a second mounting plate mounted with the housing, and an electrolyte; the first mounting plate, the second mounting plate and the housing cooperatively define a chamber to receive the electrolyte.

* * * * *